US011180702B2

(12) United States Patent
Sunkara et al.

(10) Patent No.: US 11,180,702 B2
(45) Date of Patent: Nov. 23, 2021

(54) NANOWIRE-BASED HYDRODESULFURIZATION CATALYSTS FOR HYDROCARBON FUELS

(71) Applicant: Advanced Energy Materials, LLC, Louisville, KY (US)

(72) Inventors: Mahendra K. Sunkara, Louisville, KY (US); Sivakumar Vasireddy, Louisville, KY (US); Juan He, Louisville, KY (US); Vivekanand Kumar, Louisville, KY (US)

(73) Assignee: Advanced Energy Materials, LLC, Louisville, KY (US)

( * ) Notice: Subject to any disclaimer, the term of this patent is extended or adjusted under 35 U.S.C. 154(b) by 83 days.

(21) Appl. No.: 16/779,016

(22) Filed: Jan. 31, 2020

(65) Prior Publication Data

US 2020/0181510 A1   Jun. 11, 2020

Related U.S. Application Data

(63) Continuation of application No. 15/859,288, filed on Dec. 29, 2017, now Pat. No. 10,584,289.
(Continued)

(51) Int. Cl.
*C10G 47/04* (2006.01)
*C10G 47/12* (2006.01)
(Continued)

(52) U.S. Cl.
CPC .............. *C10G 47/04* (2013.01); *B01J 21/04* (2013.01); *B01J 21/063* (2013.01); *B01J 21/08* (2013.01);
(Continued)

(58) Field of Classification Search
CPC .. C10G 47/04; C10G 47/12; C10G 2300/202; C10G 2300/207; C10G 2400/04
(Continued)

(56) References Cited

U.S. PATENT DOCUMENTS 7,186,669 B2     3/2007   Gole et al.
8,535,632 B2 *   9/2013   Chase .................... C02F 1/725
                                                              423/239.1
(Continued)

*Primary Examiner* — Patricia L. Hailey
(74) *Attorney, Agent, or Firm* — Law Office of J L. Simunic

(57) ABSTRACT

The present development is a metal particle coated nanowire catalyst for use in the hydrodesulfurization of fuels and a process for the production of the catalyst. The catalyst comprises titanium(IV) oxide nanowires wherein the nanowires are produced by exposure of a $TiO_2$—KOH paste to microwave radiation. Metal particles selected from the group consisting of molybdenum, nickel, cobalt, tungsten, or a combination thereof, are impregnated on the metal oxide nanowire surface. The metal impregnated nanowires are sulfided to produce catalytically-active metal particles on the surface of the nanowires The catalysts of the present invention are intended for use in the removal of thiophenic sulfur from liquid fuels through a hydrodesulfurization (HDS) process in a fixed bed reactor. The presence of nanowires improves the HDS activity and reduces the sintering effect, therefore, the sulfur removal efficiency increases.

16 Claims, 5 Drawing Sheets

Related U.S. Application Data

(60) Provisional application No. 62/440,937, filed on Dec. 30, 2016.

(51) Int. Cl.

| | | |
|---|---|---|
| *B01J 21/06* | (2006.01) | |
| *B01J 21/08* | (2006.01) | |
| *B01J 21/04* | (2006.01) | |
| *B01J 23/14* | (2006.01) | |
| *B01J 35/00* | (2006.01) | |
| *B01J 35/02* | (2006.01) | |
| *B01J 37/20* | (2006.01) | |
| *B01J 35/06* | (2006.01) | |
| *B01J 37/34* | (2006.01) | |
| *B01J 27/051* | (2006.01) | |
| *B82Y 30/00* | (2011.01) | |
| *B01J 23/883* | (2006.01) | |
| *B01J 23/882* | (2006.01) | |

(52) U.S. Cl.
CPC ........... *B01J 23/14* (2013.01); *B01J 27/0515* (2013.01); *B01J 35/006* (2013.01); *B01J 35/023* (2013.01); *B01J 35/06* (2013.01); *B01J 37/20* (2013.01); *B01J 37/346* (2013.01); *B01J 37/349* (2013.01); *C10G 47/12* (2013.01); *B01J 23/882* (2013.01); *B01J 23/883* (2013.01); *B01J 2523/00* (2013.01); *B82Y 30/00* (2013.01); *C01P 2004/03* (2013.01); *C01P 2004/13* (2013.01); *C01P 2004/64* (2013.01); *C10G 2300/202* (2013.01); *C10G 2300/207* (2013.01); *C10G 2400/04* (2013.01)

(58) Field of Classification Search
USPC ......... 208/209, 213, 293, 212; 977/762, 811
See application file for complete search history.

(56) References Cited

U.S. PATENT DOCUMENTS

| | | |
|---|---|---|
| 8,835,285 B2 | 9/2014 | Grimes et al. |
| 9,095,837 B2 | 8/2015 | Viswanathan |
| 9,463,442 B2 | 10/2016 | Lin et al. |
| 9,738,541 B2 | 8/2017 | Cheung et al. |
| 10,090,425 B2 | 10/2018 | Lewis et al. |
| 2007/0087470 A1 | 4/2007 | Sunkara et al. |
| 2009/0117028 A1 | 5/2009 | Kundu |
| 2010/0025301 A1 | 2/2010 | Borgna et al. |
| 2010/0038285 A1* | 2/2010 | Toledo Antonio ..... B01J 23/882 208/143 |
| 2010/0248945 A1 | 9/2010 | Eijsbouts-Spickova et al. |
| 2010/0284902 A1 | 11/2010 | Junior et al. |
| 2013/0017145 A1 | 1/2013 | Sunkara et al. |
| 2013/0294985 A1 | 11/2013 | Bonne et al. |
| 2014/0256534 A1 | 9/2014 | Gao et al. |
| 2017/0165640 A1 | 6/2017 | Cervantes et al. |

* cited by examiner

Figure 1a
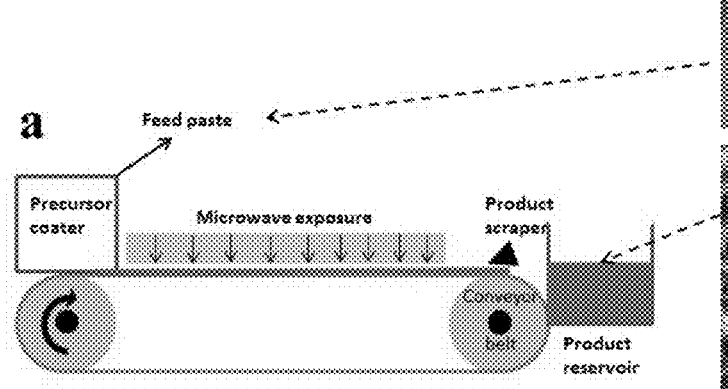
Figure 1b
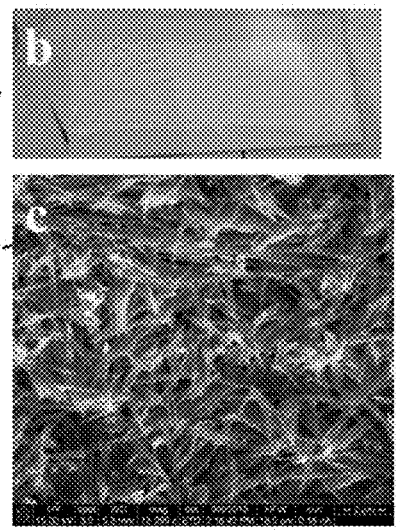
Figure 1c
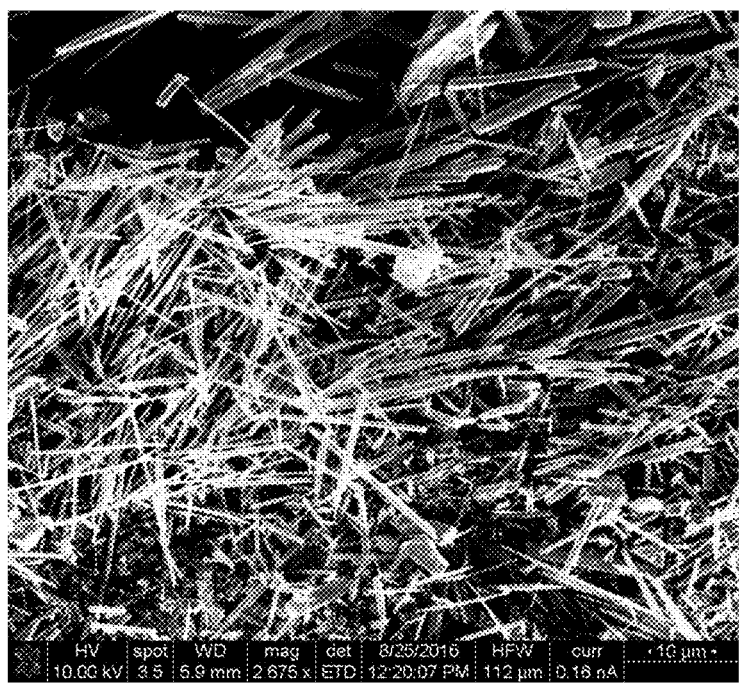
Figure 2

NANOWIRE-BASED HYDRODESULFURIZATION CATALYSTS FOR HYDROCARBON FUELS

DOMESTIC BENEFIT INFORMATION/PRIORITY CLAIM

The present application claims priority to U.S. Patent Application 62/440,937 filed 2016 Dec. 30, and U.S. patent application Ser. No. 15/859,288 filed 2017 Dec. 29, currently pending, and PCT/US18/12006 filed 1 Jan. 2018, now expired, all of which are incorporated by reference in their entireties.

GOVERNMENT INTEREST

This invention was made with government support under grant number SC0015808 awarded by the U.S. Department of Energy. The government has certain rights in the invention.

BACKGROUND

The presently-disclosed subject matter relates to the production of titanium dioxide ($TiO_2$) nanowires, catalyst compositions and methods for desulfurization. In particular, the presently-disclosed subject matter relates to catalyst compositions and methods for desulfurization that make use of titanium(IV) oxide nanowires that include catalytically-active metal sulfide nano-particles or nanowires as an active phase, and more particularly wherein the metal is selected from the group consisting of molybdenum, nickel, cobalt, tungsten and a combination thereof.

Although the motor fuels market in the US is dominated by gasoline, the demand for diesel fuel remains strong and is growing. Comparing US demand in June 2014 to that of June 2015, clean-diesel vehicle sales increased by 25%, and demand for on-road diesel fuel increased by 11.8%. In contrast, demand for gasoline decreased by 3.4%. The market share for diesel-fueled vehicles, approximately 3% of US vehicle sales now, may double by 2018. Unfortunately, sulfur contamination is a major problem in diesel fuels.

Sulfur is a natural component in crude oil and therefore is also present in gasoline and diesel fuel. With respect to diesel, light cycle oil (LCO), a middle distillate product in the fluid catalytic cracking (FCC) of heavy oils, such as vacuum gas oil and atmospheric residue, is usually blended in the diesel pool. However, LCO, which comprises about 15% of the total US distillate pool, is a poor diesel fuel blending component, due to its low cetane number which is typically from about 15 to about 25, and its high sulfur content, which can range from about 2000 ppm to about 7000 ppm. The high sulfur content means that deep hydrotreatment is required to obtain sulfur-free and high-cetane-number fuel. In addition, the presence of sulfur increases SOx emissions, contributes to the emission of fine particulates, leads to the corrosion of engine systems (which decreases engine life), and irreversibly poisons the noble metal catalysts in the engine's converter. For all of these reasons, the reduction of sulfur in diesel fuel is important.

Since September 2007, all of the on-highway diesel fuel sold at gas stations in the United States is ultra-low-sulfur diesel (ULSD), for which the allowable sulfur content is 15 ppm. Beginning in 2017, new vehicle emission standards issued by the US EPA Tier 3 program will lower the allowable sulfur content of gasoline from 30 ppm to 10 ppm. Consequently, refineries are facing major challenges to meet this fuel sulfur specification.

Thus, in the past decade, clean fuels research, including ultra-deep desulfurization, has become a more important subject of environmental catalysis studies worldwide. One aspect of this research is identifying catalysts that can be highly effective in the hydrodesulfurization process (HDS). Related to this is identifying processes that can be highly efficient in producing catalysts for use in HDS processes.

SUMMARY OF THE PRESENT INVENTION

The present development is a process for the production of metal oxide nanowires decorated with mono- or bimetals. The metal oxide used for making the nanowire may be titanium(IV) oxide ($TiO_2$), silicon oxide ($SiO_2$), tin oxide ($SnO_2$), alumina, or a combination thereof, and the metals for decorating the nanowires may be selected from molybdenum, nickel, cobalt, tungsten and combinations thereof. In a preferred embodiment, the present development is a process for the production of titanium(IV) oxide nanowires and/or porous titanium(IV) oxide nanowires decorated with mono- or bimetals selected from the group consisting of molybdenum, nickel, cobalt, tungsten, and a combination thereof.

The process comprises the following steps: (a) preparing a paste from a metal oxide powder and a hydroxide salt and water, (b) spreading the paste as a thin layer on a substrate, (c) exposing the paste-coated substrate to microwave radiation to form a metal oxide nanowire, and (d) loading one or more catalytically-active metals onto the metal oxide nanowire via impregnation or incipient wetness techniques.

The present development is further a process for using the metal oxide nanowires decorated with mono- or bimetals in a hydrodesulfurization process. The process involves providing a metal oxide nanowire decorated with mono- or bimetals and exposing the decorated metal oxide nanowire to a sulfiding agent to produce a metal oxide nanowire with catalytically-active metal sulfide particles on the surface, and then using the sulfided nanowire to remove sulfur-containing compounds from hydrocarbon feedstocks. Specifically, the catalysts of the present invention are intended use in the removal of thiophenic sulfur from liquid fuels through a hydrodesulfurization (HDS) process in a fixed bed reactor. The presence of nanowires improves the HDS activity and reduces the sintering effect, therefore, the sulfur removal efficiency increases.

BRIEF DESCRIPTION OF THE FIGURES

FIG. 1a is a schematic of a microwave conveyor belt system used for microwave exposure assisted nanowires production;

FIG. 1b is a photograph of a $TiO_2$ and KOH mixed paste spread on an alumina substrate prior to microwave exposure;

FIG. 1c is a scanning electron microscopy (SEM) image of the as-synthesized $TiO_2$ nanowires;

FIG. 2 is an SEM image of fresh $TiO_2$ nanowires;

DETAILED DESCRIPTION OF THE INVENTION

Figure 3:
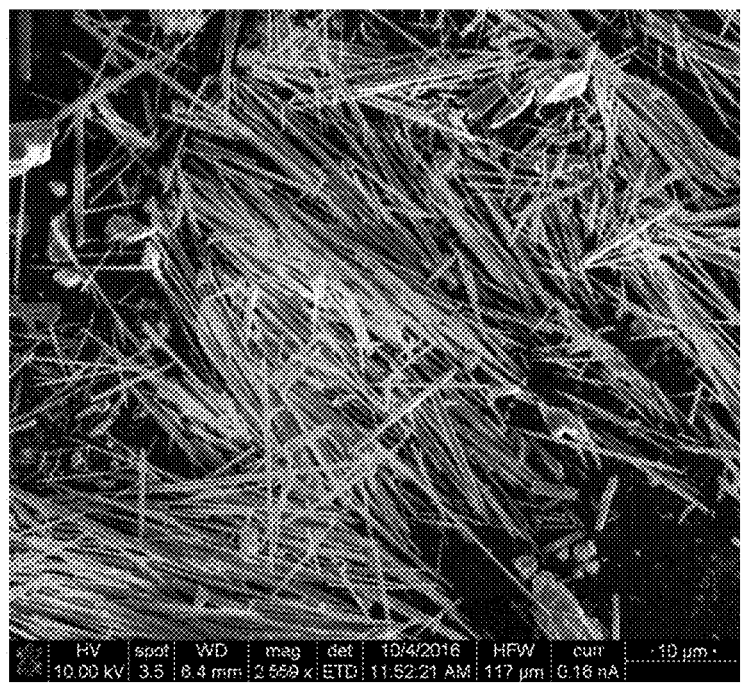
FIG. 3 is an SEM image of fresh Ni and Mo loaded on $TiO_2$ nanowires at low magnification (mag=2,559×)

The present development is a process for the production of a catalyst comprising a metal oxide nanowire with catalytically-active metal sulfide particles on the surface. More specifically, the present invention is a process for the production of a catalyst comprising metal oxide nanowires as a support impregnated with decorating metals that are exposed to a sulfiding agent to produce a metal oxide nanowire with catalytically-active metal sulfide particles on the surface. The metal oxide for making the metal oxide nanowire may be titanium(IV) oxide (TiO$_2$), silicon oxide (SiO$_2$), tin oxide (SnO$_2$), γ-alumina, or a combination thereof, and the metals for impregnating or decorating the nanowires may be selected from molybdenum, nickel, cobalt, tungsten and combinations thereof. In a preferred embodiment, the present development is a process for the production of titanium(IV) oxide nanowires and/or porous titanium(IV) oxide nanowires decorated with mono- or bimetals selected from the group consisting of molybdenum, nickel, cobalt, tungsten, and a combination thereof. The resulting catalyst may be used in the hydrodesulfurization process in oil refining processes.

The process of the present invention improves on the methods of the prior art by being significantly faster for the formation of the metal oxide nanowires than the prior art, thereby allowing for increased production in a predetermined time period. For example, the present invention can produce metal oxide nanowires from a paste comprising a metal oxide powder, with or without a binder, and a hydroxide salt in less than about one minute as compared to the prior art processes that can take several hours. The present method is accomplished by causing the nanowires to form by exposure to microwave radiation. Specifically, metal oxide nanowires are prepared according to the present invention by mixing a metal oxide powder (MO) and a hydroxide salt (MOH), such as KOH, with sufficient water to form a paste. The MO-MOH paste is spread on an inert substrate as a thin film. The film-covered substrate is exposed to microwave energy for less than one minute and the product is collected. In a preferred embodiment, the film-covered substrate is exposed to microwave energy on a moving conveyor belt. The resulting product is a mass of metal oxide nanowires having a length of from about 0.1 μm to about 10 μm. A schematic of the process is shown in FIG. 1a.

Generally, the process of the present invention is a multistep process that comprises: (a) preparing a paste from a metal oxide powder, with or without a binder, and a hydroxide salt and water; (b) spreading the paste as a thin film on a substrate; (c) exposing the paste-coated substrate to microwave radiation to form a metal oxide nanowire; (d) loading one or more decorating metals onto the metal oxide nanowire; and (e) exposing the metal impregnated metal oxide nanowire to a sulfiding agent to produce a metal oxide nanowire with catalytically-active metal sulfide particles on the surface. The nanowire morphology and conversion can be increased by reducing the paste film thickness on the substrate, or by increasing the film uniformity by better metal precursor and alkali salt mixing, or by optimizing the precursor ratio, or by increasing the microwave power, or by preventing non-uniform heating, or by a combination thereof.

FIG. 1b is a photograph of a titanium(IV) oxide (TiO$_2$) and potassium hydroxide (KOH) mixed paste spread on an alumina substrate prior to microwave exposure as per step (b) of the process. FIG. 1c is a scanning electron microscopy (SEM) image of the as-synthesized TiO$_2$ nanowires following step (c) of the process.

It is anticipated that the metal oxide used for making the nanowire may be titanium(IV) oxide (TiO$_2$), silicon oxide (SiO$_2$), tin oxide (SnO$_2$), alumina, or a combination thereof. Optionally, as is known in the art, a binder, such as alumina, bentonite clay or combinations thereof, may be added to the paste to improve crushing strength. In a preferred embodiment, the nanowire is a TiO$_2$ nanowire or a TiO$_2$/Al$_2$O$_3$ nanowire. In the TiO$_2$/Al$_2$O$_3$ nanowire, the Al$_2$O$_3$ preferably comprises from 0 wt % to about 25 wt % of the nanowire and more preferably comprises from about 5 wt % to about 20 wt % of the nanowire. Further, as is known in the art, nanowire lengths and diameters will vary. In a preferred embodiment of the present invention, the nanowires have a length of from about 100 nm to about 10 μm and a diameter of from about 5 nm to about 50 nm. The TiO$_2$ nanowires further preferably have an average surface area of about 25 m$^2$ per gram of nanowires.

Exemplary metals for decorating the nanowires include molybdenum, nickel, cobalt, tungsten, their respective oxides, alloys of two or more of these metals, and combinations thereof. The decorating metals may be in the form of an elemental metal or an oxide. It is recommended that the decorating metals be loaded onto the metal oxide nanowire using wet impregnation or incipient wetness techniques, although other methods known in the art may be used. If wet impregnation or incipient wetness techniques are used, the metals are preferably provided as metal nitrates or metal acetates, as is known in the art, although other sources for the decorating metals are not precluded. By following the process of the present invention, the decorating metals are deposited on the surface of the nanowires as particles. Without limiting the scope of the invention, it is recommended that the diameter of the decorating metal particles be from about 2 nm to about 20 nm. Further, as is known in the art, following impregnation of the nanowire with the metal particles, the metal impregnated nanowire may be thermally treated. Exemplary means for thermally treating the metal impregnated nanowires include microwave radiation or a thermal furnace. Representative examples of decorating metals on a nanowire support include, but are not limited to, nickel and molybdenum on titanium(IV) oxide nanowires (NiMo/TiO$_2$ or the oxide Ni$_x$Mo$_{1-x}$O$_3$/TiO$_2$), cobalt and molybdenum on titanium(IV) oxide nanowires (CoMo/TiO$_2$ or the oxide Co$_x$Mo$_{1-x}$O$_3$/TiO$_2$), nickel and cobalt and molybdenum on titanium(IV) oxide nanowires (NiCoMo/TiO$_2$), nickel and molybdenum on titanium(IV) oxide and silicon oxide nanowires (NiMo/TiO$_2$—SiO$_2$), cobalt and molybdenum on titanium(IV) oxide and silicon oxide nanowires (CoMo/TiO$_2$—SiO$_2$), nickel and cobalt and molybdenum on titanium(IV) oxide and silicon oxide nanowires (Ni—Co—Mo/TiO$_2$—SiO$_2$), nickel and molybdenum on titanium(IV) oxide nanowires with alumina (NiMo/TiO$_2$—Al$_2$O$_3$), cobalt and molybdenum on titanium (IV) oxide nanowires with nanowires (CoMo/TiO$_2$—Al$_2$O$_3$), nickel and cobalt and molybdenum on titanium(IV) oxide nanowires with alumina (Ni—Co—Mo/TiO$_2$—Al$_2$O$_3$).

The decorating metal loading is preferably from about 3 wt % to about 20 wt %, and is more preferably from about 3 wt % to about 15 wt %. Further, the loading may be metal dependent. For example, nickel or cobalt or nickel-cobalt loading preferably ranges from about 3 wt % to about 15 wt %, and more preferably from about 3 wt % to about 10 wt %, whereas molybdenum loading preferably ranges from about 10 wt % to about 20 wt %, and more preferably from about 12 wt % to about 18 wt %.

As indicated supra, the process of the present invention is a multistep process. In an exemplary embodiment for the preparation of the decorated metal oxide nanowires (steps a-d), (a) TiO$_2$ and KOH powders are mixed in an approximately 5:1 weight ratio (TiO$_2$:KOH) and made into paste form by adding water; (b) the TiO$_2$—KOH paste is spread on an alumina substrate as a thin film with thickness of approximately 0.25 inches; (c) the alumina substrate with the TiO$_2$—KOH paste material is exposed to microwave energy of about 915 MHz, 10 kW for about 45 seconds in a moving conveyor belt facility to produce TiO$_2$ nanowires; and (d) the decorating metal nickel is loaded onto the TiO$_2$ nanowires using wet impregnation techniques such that the final metal loading is preferably from about 3 wt % to about 15 wt %. As shown in the SEM images of FIG. 2, the as-synthesized product after step (c) is a mass of TiO$_2$ nanowires having a length of from about 5 μm to about 10 μm. Wet impregnation techniques, as used in step (d) are known in the art. In the present exemplary embodiment, it is recommended that an aqueous solution of nickel nitrates or nickel acetates be used for loading the decorating metals onto the nanowires.

Figure 4:
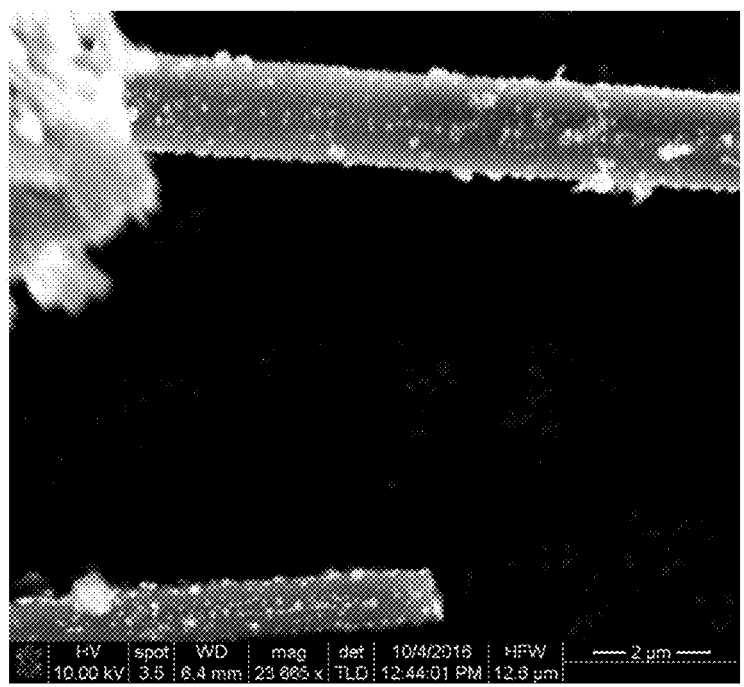
FIG. 4 is an SEM image of fresh Ni and Mo loaded on $TiO_2$ nanowires at high magnification (mag=23,665×)

As is known in the art, the metal coated nanowires may be dried and shaped into extrudates and calcination in a furnace at a predetermined temperature for a predetermined period of time. The catalyst properties may be characterized by X-ray diffraction (XRD), scanning electron microscopy (SEM), transition electron microscopy (TEM), X-ray photoelectron spectroscopy (XPS), and other techniques known in the art. In a preferred embodiment, the metal coated nanowires are dried and shaped into extrudates of about 1.2 mm diameter and about 1 cm length and are calcined at from about 400° C. to about 500° C. for from about 2 hours to about 4 hours. An SEM image of a NiMo/TiO$_2$ nanowire catalyst as synthesized is shown in FIGS. 3 and 4.

Figure 5:
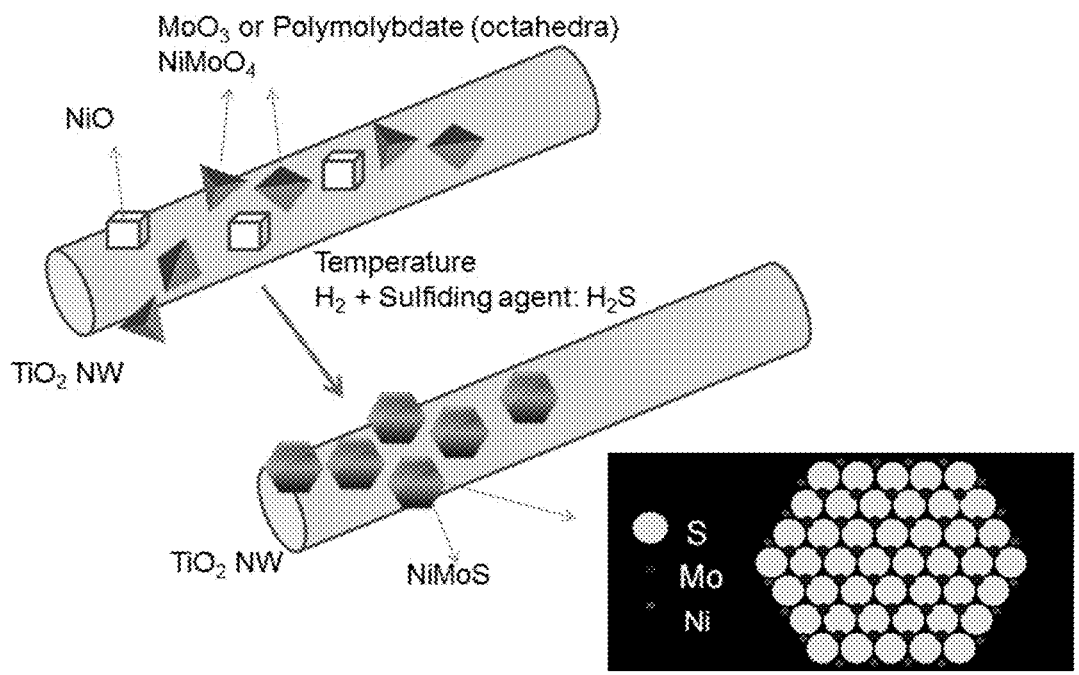
FIG. 5 is schematic drawing of fresh Ni and Mo loaded on $TiO_2$ nanowires followed by exposure of the catalyst to a sulfiding agent to produce a sulfide.

The decorated metal oxide nanowires are intended to be used in the hydrodesulfurization process in the oil refining processes. Prior to using the catalyst for hydrodesulfurization, it is beneficial to subject the catalyst to an activation or sulfidation step. Without limiting the scope of the invention, it is recommended that sulfidation be carried out by treating the decorated metal oxide nanowires either with hydrogen sulfide or with dimethyl disulfide. Exposing the decorated metal oxide nanowire or metal impregnated metal oxide nanowire to a sulfiding agent produces a metal oxide nanowire with catalytically-active metal sulfide particles on the surface. FIG. 5 is a schematic of the sulfidation process. The metal oxide nanowire with catalytically-active metal sulfide particles may be used to remove an assortment of refractory sulfur species, such as thiophene, benzothiophene (BT), dibenzothiophene (DBT), 4,6-dimethyldibenzothiophene (DMDBT), 4-methyldibenzothiophene (MDBT) or a combination thereof, in the hydrodesulfurization of hydrocarbon fuels selected from the group consisting light cycle oil (LCO), diesel fuel, jet fuel, kerosene, similar sulfur containing hydrocarbons, and combinations thereof. Further, the presence of nanowires improves the HDS activity and reduces the sintering effect, therefore, the sulfur removal efficiency increases. When the metal oxide nanowire with catalytically-active metal sulfide particles is a titanium oxide-alumina nanowire, the sulfur content may be reduced to a concentration of about 20 ppm more effectively and efficiently than the prior art commercial catalyst.

The following examples are intended to provide the reader with a better understanding of the invention. The examples are not intended to be limiting with respect to any element not otherwise limited within the claims. For example, the present invention will be described in the context of titanium(IV) oxide nanowires, but the teachings herein are not limited to titanium(IV) oxide nanowires.

Catalyst Preparation

TiO$_2$ Nanowire Synthesis—Present Invention:

Titanium(IV) oxide nanowires are prepared according to the present invention by mixing TiO$_2$ powder and KOH powder in an approximately 5:1 weight ratio (TiO$_2$:KOH) and made into paste form by adding water. The TiO$_2$—KOH paste is spread on a γ-alumina substrate as a thin film having a thickness of approximately 0.25 inches. The film-covered substrate is exposed to microwave energy of 915 MHz, 10 kW for about 45 seconds in a moving conveyor belt facility. As shown in the SEM images of FIG. 2, the as-synthesized product is a mass of TiO$_2$ nanowires having a length of from about 5 μm to about 10 μm.

TiO$_2$ Nanowire Synthesis—Prior Art Method:

Titanium(IV) oxide nanowires and porous titanium(IV) oxide nanowires are prepared by mixing TiO$_2$ powder and KOH powder in an approximately 5:1 weight ratio (TiO$_2$:KOH) and then placing the powder mixture in a furnace at temperatures of from about 800° C. to about 1000° C. for time period of from about 1 hour to about 4 hours to form K$_2$TiO$_3$ powder. The K$_2$TiO$_3$ powder is removed from the furnace and washed with 0.5 M HCl acid for about 15 minutes to 30 minutes. The washed powder is filtered and then washed with deionized (DI) water. The DI-washed powder is then dried in an oven at temperatures of from about 80° C. to about 120° C. for from about 1 hour to about 3 hours. After the oven drying, the oven temperature is raised at a rate of about 5° C. per minute to a temperature of about 450° C. and the material is calcined at about 450° C. for about 3 hours to obtain TiO$_2$ nanowires and porous TiO$_2$ nanowires.

NiCoMo/TiO$_2$ Catalyst:

A 20 g sample of a NiCoMo/TiO$_2$ catalyst having the composition 3% NiO-3% Co$_3$O$_4$-15% MoO$_3$-79% TiO$_2$ is prepared. A mixture solution containing about 2.336 g nickel nitrate hexahydrate, about 3.679 g ammonium heptamolybdate and about 2.175 g cobalt nitrate hexahydrate dissolved in about 15 ml of DI H$_2$O is prepared at a temperature of about 23° C. with gentle stirring. Approximately 15.8 g TiO$_2$ nanowires prepared according to the present invention are added to the metal solution mixture and the metals are co-impregnated onto the nanowires by stirring for about 20 minutes and then removing the metal-treated nanowires from the solution and spreading them onto a tray and then drying them in an oven set at about 120° C. for approximately 15 hours. After the oven drying, and without removing the metal-treated nanowires from the oven, the oven temperature is raised at a rate of about 5° C. per minute to a temperature of about 450° C. and the metal-treated nanowires are calcined at about 450° C. for about 3 hours to produce a nickel/cobalt/molybdenum decorated titanium oxide nanowire catalyst having the composition 3% NiO-3% $Co_3O_4$-15% $MoO_3$-79% $TiO_2$.

$NiMo/TiO_2$—$Al_2O_3$ Catalyst:

A 20 g sample of a $NiMo/TiO_2$—$Al_2O_3$ catalyst having the composition 3% NiO-12% $MoO_3$-65% $TiO_2$-20% $Al_2O_3$ is prepared. A mixture solution containing about 2.336 g nickel nitrate hexahydrate and about 2.944 g ammonium heptamolybdate is dissolved in about 20 ml of DI water is prepared at a temperature of about 23° C. with gentle stirring. Approximately 13 g $TiO_2$ nanowires prepared according to the present invention and 4 g γ-$Al_2O_3$ powder are added to the metal solution mixture and the metals are co-impregnated onto the nanowires by stirring for about 20 minutes and then removing the treated nanowires from the solution and spreading them onto a tray and then drying them in an oven set at about 120° C. for approximately 15 hours. After the oven drying, and without removing the metal-treated nanowires from the oven, the oven temperature is raised at a rate of about 5° C. per minute to a temperature of about 450° C. and the treated nanowires are calcined at about 450° C. for about 3 hours to produce a nickel/molybdenum decorated titanium oxide and alumina nanowire catalyst having the composition 3% NiO-12% $MoO_3$-65% $TiO_2$-20% $Al_2O_3$.

$CoMo/TiO_2$—$Al_2O_3$ Catalyst:

A 20 g sample of a cobalt/molybdenum decorated titanium oxide and alumina nanowire ($CoMo/TiO_2$—$Al_2O_3$) catalyst having the composition 3% $Co_3O_4$-12% $MoO_3$-65% $TiO_2$-20% $Al_2O_3$ catalyst is prepared. The preparation method is identical to the method for preparation of the $NiMo/TiO_2$—$Al_2O_3$ catalyst except 2.175 g cobalt nitrate hexahydrate solution is used in place of the 2.336 g nickel nitrate hexahydrate solution.

Hydrodesulfurization Process

Sulfidation:

Prior to using the catalyst for hydrodesulfurization, it is beneficial to subject the catalyst to an activation or sulfidation step. Freshly prepared decorated metal oxide nanowires are packed into a stainless steel fixed bed reactor. Although not required for the catalyst to function, it is recommended that prior to loading the reactor bed, the catalyst be crushed to particles with dimensions of about 1.2 mm to about 1.5 mm diameter and a length of 3 mm to about 5 mm to improve contact of the hydrocarbon feedstock that is to be subjected to hydrodesulfurization process. The packed catalyst is then pretreated by heating the reactor to a temperature of about 150° C. and flowing nitrogen gas ($N_2$) over the catalyst bed for about 2 hours. The catalyst is then subjected to the sulfidation step. Without intending to limit the scope of the inventions, the following two methods for sulfidation are suggested:

Sulfidation with $H_2S$:

10 vol % $H_2S$ in $H_2$ gas is allowed to flow over the packed catalyst at a temperature of about 400° C. for from about 4 hours to about 15 hours. The $H_2S$ flow time will vary depending on the catalyst metal loading.

Sulfidation with DMDS:

Diesel feedstock is allowed to flow over the packed catalyst at a temperature of about 120° C. for from approximately 2 hours to approximately 4 hours to ensure complete catalyst wetting. The reactor temperature is increased to temperatures from about 200° C. to about 240° C. and then dimethyl disulfide liquid (DMDS) is injected onto the catalyst along with the diesel feedstock at a concentration to maintain from about 1 wt % to about 2 wt % sulfur concentration. The feedstock/DMDS flow is continued until sulfur breakthrough is observed at from about 3000 ppm to about 3500 ppm sulfur in the outlet of reactor. The reactor temperature is then raised to about 340° C. at a rate of from about 10° C./hr to about 15° C./hr and the temperature is maintained to about 340° C. for from about 1 hour to about 2 hours. The flow of DMDS onto the catalyst is then stopped.

Hydrodesulfurization:

The hydrodesulfurization testing is conducted using a model hydrocarbon stream spiked with from about 400 ppm to about 700 ppm sulfur by weight with an assortment of refractory sulfur species to closely resemble industrial conditions. Decorated metal oxide nanowires are loaded into a fixed bed reactor and sulfided. Following sulfidation, the reactor temperature is cooled to a hydrodesulfurization temperature of from about 300° C. to 400° C., and more preferably at from about 350° C. to 375° C. A hydrogen flow is started to pressurize the reactor to an HDS pressure of from about 15 bar to about 50 bar, more preferably from about 20 bar to about 30 bar. A hydrocarbon feedstock is then passed through the catalyst at a liquid hourly space velocity of from about 0.5 $h^{-1}$ to 3 $h^{-1}$, more preferably at about 1 $h^{-1}$.

Hydrodesulfurization of LCO using $NiMo/TiO_2$—$Al_2O_3$ Catalyst:

About 20 g of a $NiMo/TiO_2$—$Al_2O_3$ catalyst (3% NiO-12% $MoO_3$-65% $TiO_2$-20% γ-$Al_2O_3$) is diluted with about 35 g of SiC and packed into the fixed bed reactor as three beds of approximately 18 g each interlayered between layers of glass beads. The catalyst is pretreated at a temperature of about 150° C. with $N_2$ for about 2 hours. The catalyst is then sulfided with 10 vol % $H_2S$ in $H_2$ gas at a temperature of about 400° C. for from about 6 hours. The reactor is cooled to a temperature of about 350° C. to about 380° C. and is pressurized to a pressure of about 15 bar to about 30 bar. A light cycle oil (LCO) hydrocarbon feed obtained from an oil refinery and having about 600 ppm to about 740 ppm by weight of sulfur is then passed through the catalyst at a liquid hourly space velocity of 0.5 $h^{-1}$ to 2 $h^{-1}$. As the gas exits the reactor, the $H_2S$ and unreacted $H_2$ gases are separated by a gas-liquid separator and exited to a vent, and the HDS treated liquid fuel exits from the reactor and is stored in a product tank. The total sulfur concentration was analyzed using UV-Fluorescence (ASTM D5453). The HDS activity of the 3% NiO-12% $MoO_3$-65% $TiO_2$-20% γ-$Al_2O_3$ catalyst is shown in Table 1.

TABLE 1

HDS of LCO samples from a small oil refinery

| Time on stream (h) | LHSV ($h^{-1}$) | Temperature (° C.) | Pressure (bar) | Sulfur concentration at outlet (ppm) |
|---|---|---|---|---|
| 0-50 | 1 | 350 | 15 | 55 ± 10 |
| 51-100 | 0.5 | 350 | 15 | 45 ± 10 |
| 101-150 | 0.5 | 380 | 15 | 40 ± 10 |
| 151-350 | 0.5 | 380 | 20 | 20 ± 10 |
| 351-400 | 1 | 380 | 30 | 35 ± 10 |

Figure 6:
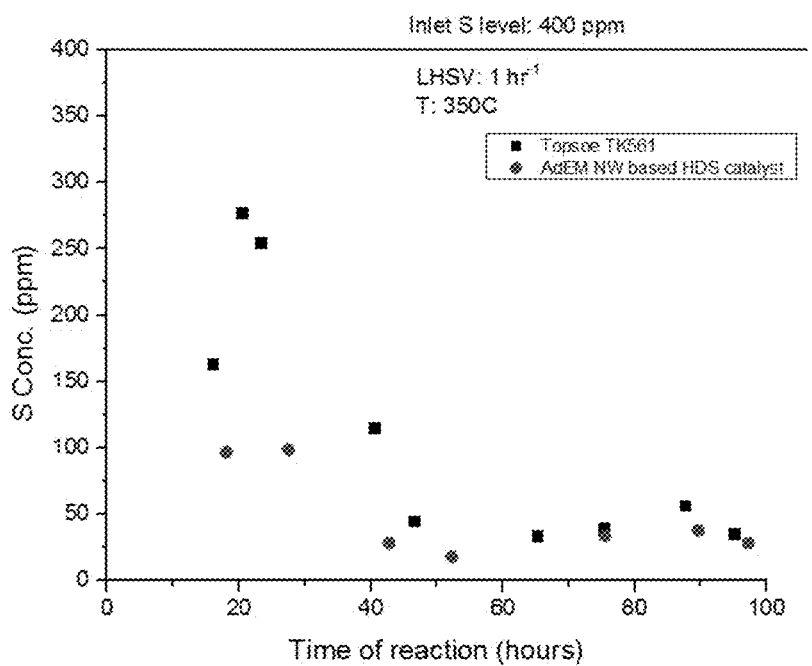
FIG. 6 is a graph of HDS activities of the 3% NiO-12% MoO$_3$-65% TiO$_2$-20% γ-Al$_2$O$_3$ catalyst from Example 7 and the Topsoe BRIM™ TK561 catalyst from Example 8.

Hydrodesulfurization of diesel fuel using $NiMo/TiO_2$—$Al_2O_3$ Catalyst:

About 20 g of fresh $NiMo/TiO_2$—$Al_2O_3$ catalyst (3% NiO-12% $MoO_3$-65% $TiO_2$-20% γ-$Al_2O_3$) is diluted with about 35 g of SiC and packed into the fixed bed reactor as three beds of approximately 18 g each interlayered between layers of glass beads. The catalyst is pretreated at a temperature of about 150° C. with $N_2$ for about 2 hours. The catalyst is then sulfided with 10 vol % $H_2S$ in $H_2$ gas at a temperature of about 430° C. for from about 6 hours. The reactor is cooled to a temperature of about 350° C. and is pressurized to a pressure of about 20 bar to about 30 bar. A diesel feed obtained from a local gas station spiked to about 400 ppm by weight sulfur with 90% thiophene and 10% a combination of benzothiophene (BT), dibenzothiophene (DBT), 4,6-dimethyldibenzothiophene (DMDBT), and 4-methyldibenzothiophene (MDBT) is then passed through the catalyst at a liquid hourly space velocity of 0.5 $h^{-1}$ to 2 $h^{-1}$. As the gas exits the reactor, the $H_2S$ and unreacted $H_2$ gases are separated by a gas-liquid separator and exited to a vent, and the HDS treated liquid fuel exits from the reactor and is stored in a product tank. The total sulfur concentration was analyzed using UV-Fluorescence (ASTM D5453). For comparison, the reaction is repeated using the same conditions and hydrocarbon feed except 20 g of Topsoe BRIM™ TK561 catalyst are used in place of the NiMo/$TiO_2$—$Al_2O_3$ catalyst. The total sulfur concentration was analyzed using UV-Fluorescence. The HDS activity of the 3% NiO-12% $MoO_3$-65% $TiO_2$-20% γ-$Al_2O_3$ catalyst and the Topsoe BRIM™ TK561 catalyst are reported in Table 2 and shown in the graph at FIG. 6. The catalyst of the present invention removes sulfur more effectively and to a lower concentration than the prior art commercial catalyst.

TABLE 2

HDS of Sulfur spiked diesel samples using two catalyst samples

| | | | $TiO_2$ NW based catalyst | | Topsoe BRIM ™ TK561 | |
|---|---|---|---|---|---|---|
| Time on stream (h) | LHSV ($h^{-1}$) | Temp (° C.) | Pressure (bar) | Sulfur conc. at outlet (ppm) | Pressure (bar) | Sulfur conc at outlet (ppm) |
| 20 | 1 | 350 | 20 | 90 | 30 | 160 |
| 40 | 1 | 350 | 20 | 25 | 30 | 120 |
| 50 | 1 | 350 | 20 | 17 | 30 | 40 |
| 75 | 1 | 350 | 20 | 25 | 30 | 30 |
| 100 | 1 | 350 | 20 | 20 | 30 | 35 |

Figure 7:
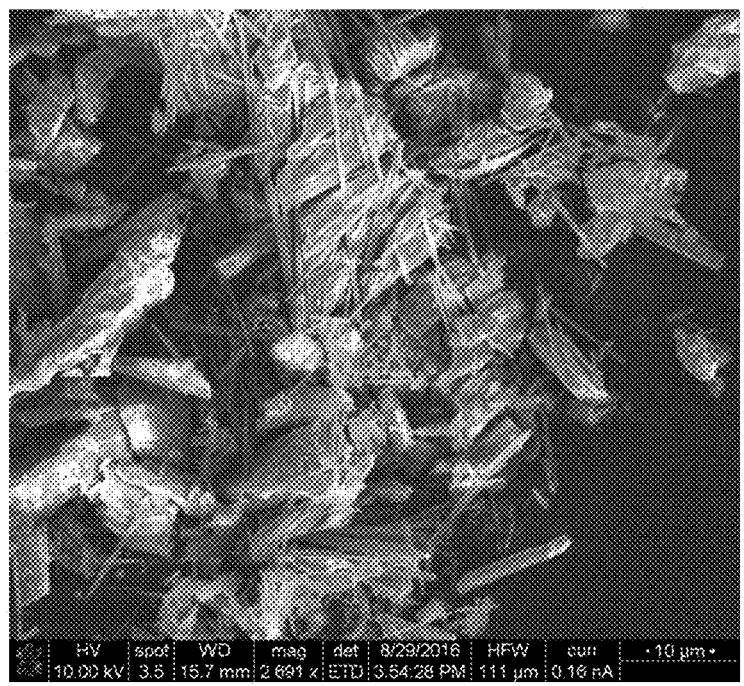
FIG. 7 is an SEM image of spent Ni and Mo loaded on TiO$_2$ nanowires at low magnification (mag=2,691×)
Figure 8:
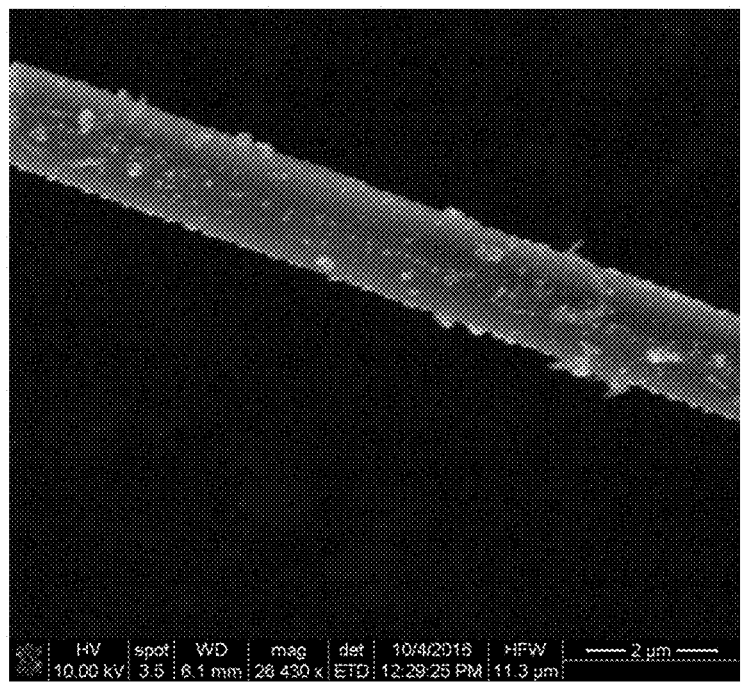
FIG. 8 is an SEM image of spent Ni and Mo loaded on TiO$_2$ nanowires at high magnification (mag=26,430×)
Figure 9:
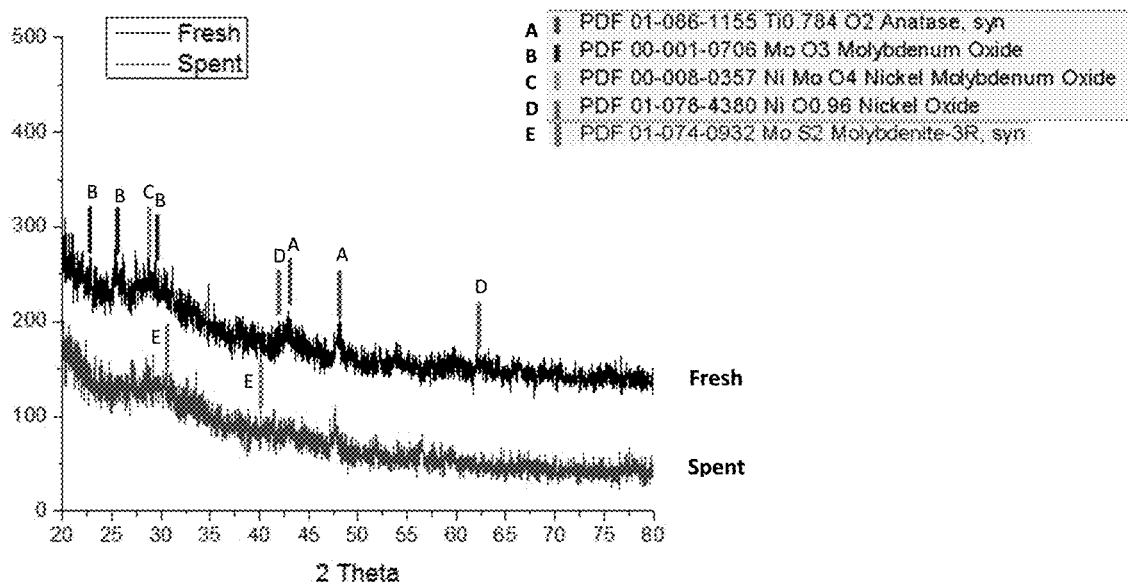
FIG. 9 is a graph showing the XRD pattern of fresh and spent Ni and Mo loaded on TiO$_2$ nanowires; and, FIG. 10 is a graph of a comparison of the total sulfur concentrations with and without the H$_2$S removal process.

Catalyst Integrity:

The spent NiMo/$TiO_2$—$Al_2O_3$ catalyst from the hydrodesulfurization of LCO experiment was examined using scanning electron microscopy (SEM). A comparison of the SEM images of the spent catalyst, shown in FIGS. 7 and 8, as compared to the fresh as-synthesized catalyst, shown in FIGS. 3 and 4, indicates that the catalyst maintained its morphology even during the HDS process. As shown in FIG. 8, the NiMoS nanoparticles were still uniformly present on the surface of the nanowire. FIG. 9 shows the X-ray diffraction patterns of the fresh and spent NiMo/$TiO_2$ nanowires catalyst samples. The peaks of $Mo_2S$ confirmed that sulfidation occurred.

Figure 10:
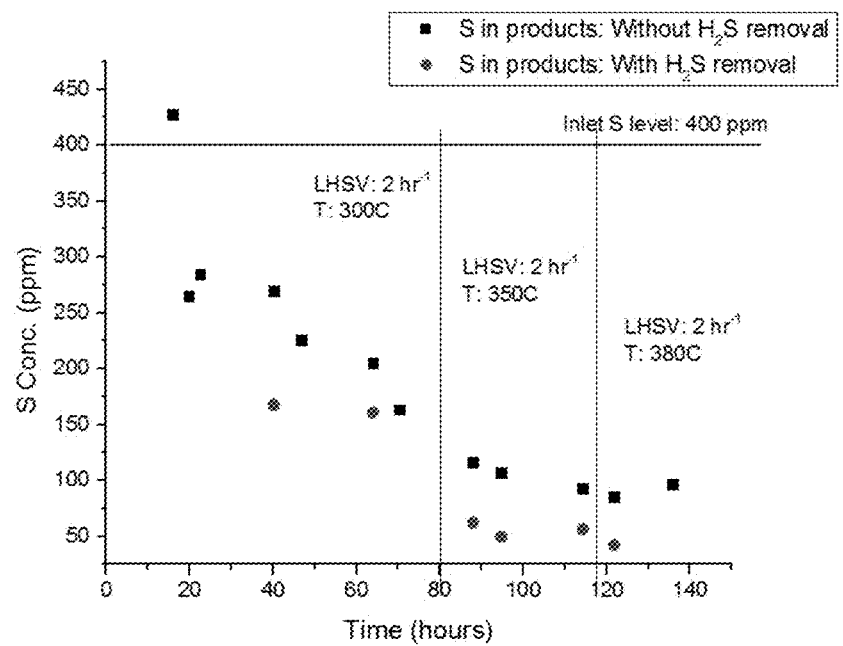

We have observed that the $H_2S$ gas generated from the HDS reaction dissolves into liquid-phase fuel. Without being bound by theory, we believe that this results in an increase of the total sulfur level in the liquid product samples. In order to remove the $H_2S$ gas molecules from the liquid phase samples, $N_2$ flushing treatment is recommended. A recommended flushing treatment uses a high purity $N_2$ gas that is flowed through the collected HDS fuel sample from the product tank for a period of about 2 hours. A comparison of the total sulfur concentrations with and without $H_2S$ removal process is shown in FIG. 10.

The metal oxide nanowires with the catalytically-active sulfide metal particles of the present invention, and particularly the titanium(IV) oxide nanowires with the catalytically-active sulfide metal particles, are intended to be used in the hydrodesulfurization process in the oil refining processes. These nanowires are unique for this purpose because nanowire-structured catalysts have not been used for hydrotreating in oil refineries. The use of nanowire-structured catalysts is expected to result in improved mass-transfer and an improved mechanical behavior during high temperature operation. Further, these nanowires are expected to offer rapid reaction rates that overcome the diffusion limitations of conventional pellet-based catalysts and allow all of the material to be used efficiently. It is anticipated that the catalysts of the present invention may be used in the hydrodesulfurization of hydrocarbon fuels selected from the group consisting of light cycle oil, diesel, jet fuel, kerosene, and combinations thereof.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° F. to about 120° F., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise. Specific compositions relevant to the titanium(IV) oxide nanowires with catalytically-active metal sulfide particles composition are provided herein for the purpose of demonstrating the invention, but these compositions are not intended to limit the scope of the invention. It is understood that one skilled in the art may make alterations to the embodiments shown and described herein without departing from the scope of the invention.

What is claimed is:

1. A method for hydrodesulfurization of hydrocarbon fuels the method comprising:
   (a) providing a fresh decorated metal oxide nanowire catalyst comprising a metal oxide nanowire loaded with one or more decorating metals;
   (b) packing the fresh catalyst into a reactor;
   (c) sulfiding the catalyst;
   (d) passing a hydrocarbon feedstock through the catalyst to remove sulfur from the feedstock; and,
   (e) collecting the desulfurized feedstock,
   wherein the catalyst sulfiding step (c) comprises allowing diesel feedstock to flow over the packed catalyst at a temperature of about 120° C. for from about 2 hours to about 4 hours, and then increasing the reactor temperature to temperatures from about 200° C. to about 240° C. and then injecting dimethyl disulfide liquid (DMDS) onto the catalyst along with the diesel feedstock at a concentration to maintain from about 1 wt % to about 3 wt % sulfur concentration, and then continuing the feedstock/DMDS flow until sulfur breakthrough is observed at from about 3000 ppm to about 3500 ppm sulfur in the outlet of reactor, and then raising the reactor temperature to about 340° C. at a rate of from about 10° C./hr to about 15° C./hr, and then maintaining the temperature at about 340° C. for from about 1 hour to about 8 hours, and then stopping the flow of DMDS contained sulfiding feedstock onto the catalyst.

2. The method of claim 1 wherein the catalyst comprises titanium(IV) oxide nanowires, porous titanium(IV) oxide (anatase phase) nanowires, silicon oxide nanowires, tin oxide nanowires, alumina nanowires, or a combination thereof.

3. The method of claim 1 wherein the decorating metal comprises molybdenum, nickel, cobalt, tungsten, molybdenum oxide, nickel oxide, cobalt oxide, tungsten oxide, or a combination thereof, or an alloy of a combination thereof.

4. The method of claim 1 wherein the hydrocarbon feedstock is selected from light cycle oil (LCO), light gas oil (LGO, vacuum gas oil (VGO), diesel fuel, jet fuel, kerosene, bunker fuel, extra-heavy oils, or combinations thereof.

5. The method of claim 1 wherein the sulfur in the feedstock is thiophene, benzothiophene (BT), dibenzothiophene (DBT), 4,6-dimethyldibenzothiophene (DMDBT), 4-methyldibenzothiophene (MDBT), or combinations thereof.

6. The method of claim 1 wherein step (c) is achieved using a sulfiding agent and the sulfiding agent is hydrogen sulfide or dimethyl disulfide.

7. The method of claim 1 wherein the catalyst sulfiding step comprises allowing 10 vol % $H_2S$ in $H_2$ gas to flow over the packed catalyst at a temperature of about 400° C. for from about 4 hours to about 15 hours.

8. The method of claim 1 wherein the fresh decorated metal oxide nanowire catalyst is formed into extrudate form with dimensions of about 1.2 mm to about 1.5 mm diameter and a length of 3 mm to about 5 mm prior to packing in the reactor.

9. The method of claim 1 further including a step to pretreat the packed catalyst by heating the reactor to a temperature of about 150° C. and flowing nitrogen gas ($N_2$) over the catalyst bed for about 2 hours prior to the catalyst sulfiding step (c).

10. The method of claim 1 wherein the temperature of the reactor is adjusted to 300° C. to 400° C. after sulfiding the catalyst and before passing a hydrocarbon feedstock through the catalyst to remove sulfur from the feedstock.

11. The method of claim 10 wherein the temperature of the reactor is adjusted to 350° C. to 375° C.

12. The method of claim 1 wherein the pressure of the reactor is adjusted to from about 10 bar to about 50 bar after sulfiding the catalyst and before passing a hydrocarbon feedstock through the catalyst to remove sulfur from the feedstock.

13. The method of claim 12 wherein the reactor is pressurized with hydrogen gas to a pressure of from about 20 bar to about 30 bar.

14. The method of claim 1 wherein the hydrocarbon feedstock passes through the catalyst at a liquid hourly space velocity of 0.5 $h^{-1}$ to 3 $h^{-1}$ to remove sulfur from the feedstock.

15. The method of claim 1 wherein nitrogen gas is allowed to flow through the desulfurized feedstock for a predetermined period of time to remove $H_2S$, and the nitrogen-treated desulfurized feedstock is collected.

16. A method for hydrodesulfurization of hydrocarbon fuels the method comprising:
  (a) providing a fresh decorated metal oxide nanowire catalyst comprising a metal oxide nanowire loaded with one or more decorating metals;
  (b) packing the fresh catalyst into a reactor;
  (c) sulfiding the catalyst;
  (d) passing a hydrocarbon feedstock through the catalyst to remove sulfur from the feedstock; and,
  (e) collecting the desulfurized feedstock, wherein the sulfur content of the desulfurized feedstock is less than or equal to 30 ppm sulfur.

\* \* \* \* \*